United States Patent [19]
Trusty

[11] 3,907,040
[45] Sept. 23, 1975

[54] POWER OPERATED LAWN EDGER

[76] Inventor: Von Aldo Trusty, Rt. 3, Big Long Lake, Wolcottville, Ind. 46795

[22] Filed: Jan. 23, 1974

[21] Appl. No.: 435,873

[52] U.S. Cl. .................. 172/15; 172/17; 172/40; 172/101
[51] Int. Cl.² .......................................... A01B 45/00
[58] Field of Search ............ 172/15, 16, 17, 18, 13, 172/14, 40, 101; 37/DIG. 18

[56] References Cited
UNITED STATES PATENTS

| | | | |
|---|---|---|---|
| 1,371,064 | 3/1921 | Agneni | 37/DIG. 18 |
| 1,428,696 | 9/1922 | Lenehan | 172/17 |
| 2,465,192 | 3/1949 | Booth | 172/40 X |
| 2,614,476 | 10/1952 | Jennings | 37/DIG. 18 |
| 3,272,559 | 9/1966 | Haynes | 172/40 X |
| 3,812,917 | 5/1974 | Strate | 172/15 |

FOREIGN PATENTS OR APPLICATIONS

| | | | |
|---|---|---|---|
| 896,792 | 5/1962 | United Kingdom | 172/40 |
| 774,588 | 5/1957 | United Kingdom | 172/15 |

Primary Examiner—Clifford D. Crowder
Attorney, Agent, or Firm—Dybvig & Dybvig

[57] ABSTRACT

A rapidly vibrating edger blade is used to dig into the ground and then beneath ground level to dig a furrow adjacent a sidewalk. The blade has a plow-like construction which causes the dug sod to be deposited alongside the furrow. The disclosed device includes an electric motor driven eccentric connected to the blade. These parts are mounted upon a support on a roller which rides along the bottom of the furrow. An operating handle is connected to the support.

8 Claims, 5 Drawing Figures

US Patent  Sept. 23,1975  3,907,040
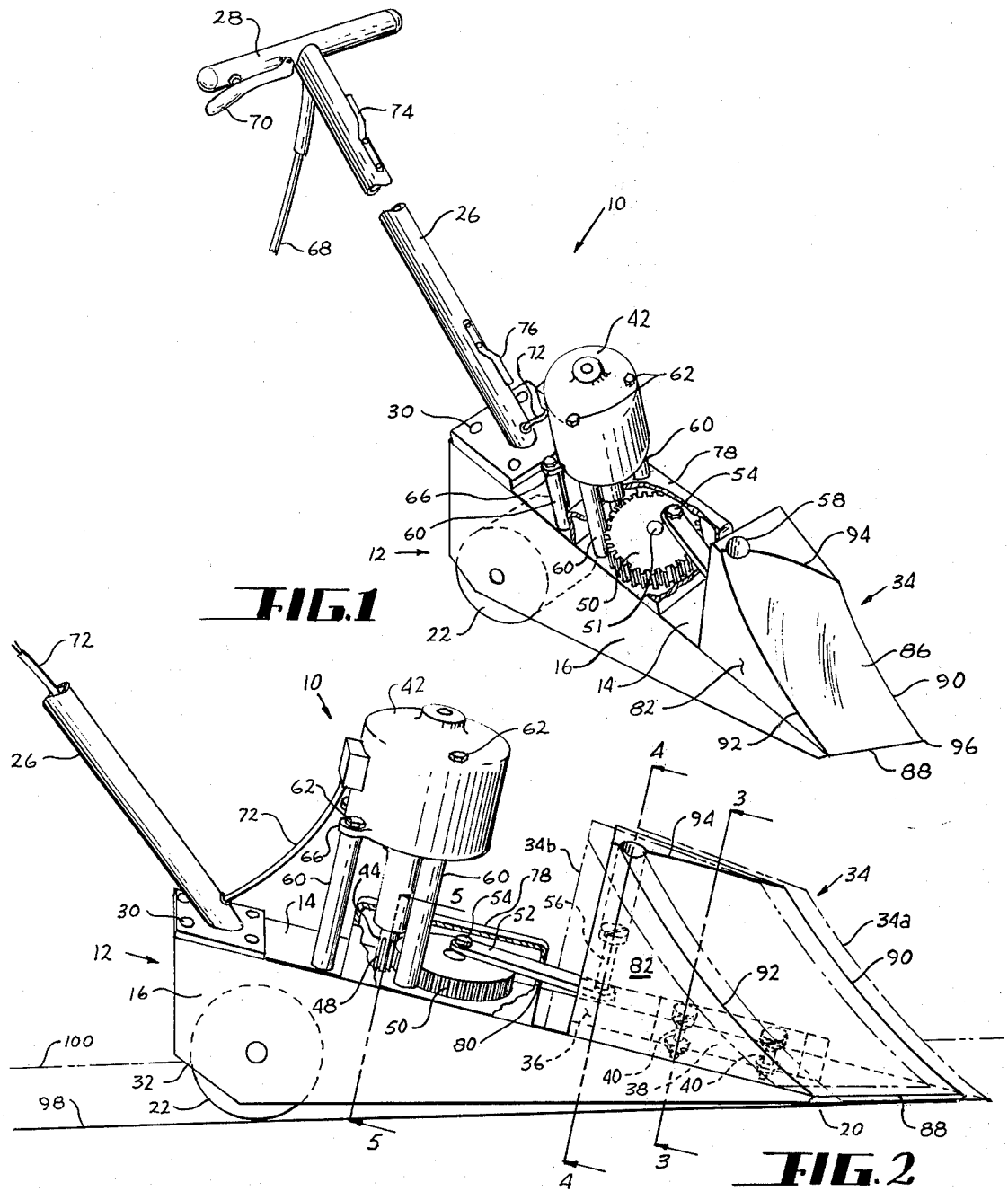
FIG.1
FIG.2
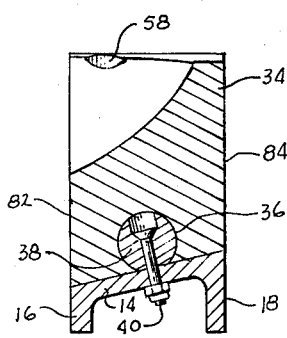
FIG.3
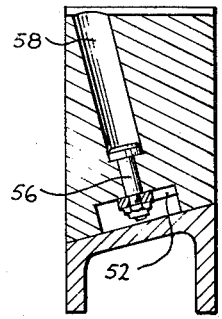
FIG.4
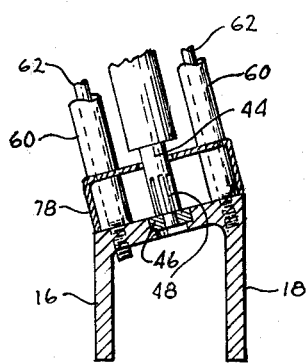
FIG.5

3,907,040

POWER OPERATED LAWN EDGER

BACKGROUND OF THE INVENTION

This invention relates to a lawn edger of the type designed to remove sod adjacent sidewalks, thereby to prevent encroachment by the sod. As will become apparent, this invention would be usable in other applications for digging furrows or trenches in the ground.

Power operated edging tools with which I am familiar rely upon rotary saw-like cutting blades or whirling scoops. Although the known power operated tools will dig furrows or trenches in the sod, they are inherently dangerous because of the spinning parts and the pebbles and other sod material thrown by them. Also it frequently is inconvenient and time-consuming to sweep up the removed sod because such devices tend to scatter the sod material. Various types of manual edging tools are shown in United States Patents having plow-like blades whereby sod dug from a furrow is laid alongside the furrow. One such device is shown in U.S. Pat. No. 962,785 granted to Reichert on June 28, 1910. Related devices are shown in the following patents:

| Patent Number | Patentee | Date of Patent |
| --- | --- | --- |
| 1,916,749 | Biringer | July 4, 1933 |
| 2,184,034 | Boward, Sr. | December 19, 1939 |
| 2,848,933 | Morton | August 26, 1958 |
| 2,899,001 | Paris | August 11, 1959 |

Although these devices may serve the purpose for which they are intended, they would be inherently difficult to use especially for heavier sod laden with vegetation.

SUMMARY OF THE INVENTION

In accordance with this invention the law edger includes a plow-like edging blade vibrated at a high rate of speed. The forward edge of the blade is designed to cut into the sod. This edge can be angled downwardly into the sod to commence the digging of a furrow and then, when the desired depth is reached, the cutting edge can easily be moved in a horizontal direction so as to complete the digging of a furrow. The vibratory impacting of the sod significantly reduces the cohesion of the sod particles so that very little operator effort is required to dig a furrow.

The preferred embodiment of my invention includes a simple support for the vibrating edger blade and an electric motor with eccentric drive for oscillating the blade on the support. An operating handle is connected to the support. A roller confined within the margins of the support adapted to roll along the bottom of the furrow provides a mounting for the entire structure. The roller is positioned rearwardly of the support so that the operating handle can be tilted downwardly for ease of moving the device about when not in use.

The edger blade is formed with an arcuate front surface tapering rearwardly and sidewardly to present a plow-like surface to the sod dug from the furrow. The blade thus causes the sod to be neatly deposited alongside the furrow where it can easily be gathered and discarded.

BRIEF DESCRIPTION OF THE DRAWING

FIG. 1 is a perspective view of a lawn edger in accordance with this invention with parts broken away to better disclose the working elements.

FIG. 2 is a side elevational view of a portion of the device of FIG. 1 with parts broken away and in cross section.

FIGS. 3, 4, and 5 are cross sectional views with parts omitted, taken along section lines 3—3, 4—4, and 5—5, respectively, of FIG. 2.

DESCRIPTION OF THE PREFERRED EMBODIMENT

With reference to the drawing, a lawn edger in accordance with this invention is generally designated 10 and includes a support member 12 constructed from an inverted channel piece having a planar top plate 14 and vertical, mutually parallel side plates 16 and 18. For reasons described below, the top plate 14 slopes downwardly from back to front and also slopes downwardly from the top of the side plate 18 to the top of the side plate 16. The side plates 16 and 18 are formed to a tapered generally triangular shape. And the plates 14, 16 and 18 terminate in a beveled leading edge 20. The support 12 is mounted on a roller element 22 journalled for rotation in and confined beneath the top plate 14 between the side plates 16 and 18.

An operating handle 26 having a transverse handgrip 28 extends upwardly and rearwardly from the support 12. Rivets or the like firmly attach a flange 30 at the base of the handle 26 to the top plate 14. The rearward lower corners of the plates 16 and 18 are cut away to leave beveled edges 32 whereby the support 12 can be tilted about the axis of the roller 24 by pushing the handgrip 28 downwardly. When so tilted, the edger 10 can be easily moved about when not in use.

The operating parts of the edger 10 are all mounted on the top plate 14. These elements comprise an edger blade generally designated 34 which, as shown in FIG. 3, may be made from a solid block milled out to provide a generally circular guide channel 36 that rides along a longitudinally extending gib 38 connected as by bolts 40 to the top plate 14. The function of the gib 38 is to retain the edger blade 34 on the top plate 14, restricting motion of the blade 34 to a linear motion along the longer axis of the support 12, while permitting the blade 34 to be oscillated or reciprocated along the top surface of the top plate 14.

Reciprocating drive means is provided for the edger blade 34 comprising a high speed drive motor 42 having an output shaft 44 (see FIGS. 2 and 5) journaled in a bearing 46 which may be trapped in the top plate 14. Coaxial to the output shaft 44 is a drive pinion 48 meshed with a drive gear 50 rotatably mounted upon an axle 51 mounted in a bearing (not shown) also located in the top plate 14. As illustrated the pinion 48 may be integral with the output shaft 44. The gear 50 is drivingly connected to the edger blade 34 by a connecting link or tie rod 52, one end of which is apertured to receive an eccentric pin 54 projecting upwardly from the gear 50. The other end is apertured to receive the shaft of a bolt 56 (FIGS. 2 and 4) extending through a circular hole 58 in the blade 34 having an axis which substantially perpendicularly intersects the top plate 14 along its longitudinal axis. The hole 58 has an enlarged diameter upper portion terminating in a shoulder against which the head of the bolt 56 bears when the parts are assembled.

The motor 42 may derive support from hollow posts or spacers 60 which project perpendicularly upwardly from the top plate 14 and which are adapted to receive mounting bolts 62 threaded into the top plate 14 and bearing against bosses 66 on the motor housing and the housing cap. Preferably the motor 42 is an electric motor energized by house current. Since the electrical wiring for the edger 10 may take any convenient form, it is not disclosed in detail herein. Very briefly it can include a power cord 68 leading to the handle 26 through a switch responsive to movement of a hand lever 70, and a conductor 72 extending partly through the handle 26 to the motor 42. When the edger is to be stored, the power cord 68 can conveniently be wrapped around clips 74 and 76 mounted on the handle 26. Any suitable housing for the gears 48 and 50, such as the illustrated shell-like housing 78, could be provided. Alternatively, the housing could also cover the motor 42. In any event, such housing should have a slot such as indicated at 80 to permit lateral movement of the tie rod 52.

The edger blade 34 is preferably of rectangular construction with parallel side faces 82 and 84 coplanar with the outer surfaces of the side plates 16 and 18, respectively. The front face 86 of the edger blade 34 slopes downwardly and forwardly and also slopes forwardly from the side face 82 to the side face 84. The face 86 is also slightly dished whereupon it can perform a plow-like function. That is, the front face 86 has a lower, horizontal knife edge 88, a relatively shorter, slightly concave vertical side edge 90, a relatively longer concave vertical side edge 92, and a concave top edge 94. The relatively longer edge 92 is also the leading edge of the side face 82. The knife edge 88 lies at an angle other than perpendicular in relation to the longitudinal axis of the support 12 and meets the relatively shorter edge 90 to form a point 96 which is the forwardmost point of the edger blade. Leading edge 20 of the support 12 is tapered or angled relative to the longitudinal axis of the support 12 so as to be parallel to the knife edge 88 along the entire length thereof.

Operation of the edger 10 to dig a furrow in sod is as follows. The handgrip 28 is raised by the operator thus tilting the device 10 to direct the point 96 downwardly into engagement with the ground. The switch controlled by the lever 70 is closed to energize the high speed motor 42 which, through the gears 48 and 50 and the tie rod 52, drives the edger blade 34 in a reciprocatory or vibratory motion at a frequency of several hundred to several thousand cycles per minute, which is a speed sufficient to produce a sod busting action as well as efficiently cut through roots of grass and the like. Tests have indicated that a vibrating speed of 3600 complete strokes per minute is satisfactory. Speeds greater or less than this would also be satisfactory. Vibration of the blade 34 results in a chopping or cutting by the point 96 and ultimately the entire leading portion of the blade 34 into the ground. High speed vibration reduces the cohesion of the sod. Accordingly, the only effort on the part of the operator required to dig into the sod is that required to tilt the device.

In FIG. 2 there is a solid horizontal reference line 98 which represents the bottom of a furrow being dug and a broken line 100 which represents the top surface of a sidewalk adjacent which the edger 10 is operated.

When the desired depth for the furrow to be dug is reached, i.e., the line 98, the operator lowers the handgrip portion 28 so as to cause the bottoms of the roller 22 and the leading edge 20 of the support 10 to come to the horizontal position illustrated in FIG. 2. The operator then merely pushes the handgrip 28 forwardly, parallel to the sidewalk line 100. Because of the back-to-front slope of the top plate 14, the vibratory motion of the blade 34 results in an impacting of the blade 34 against the sod in both a downwardly direction and a forwardly direction. Thereby, the sod in advance of the blade 34 will be efficiently broken apart and dug up.

Preferably the bottom of the furrow being dug will be horizontal across its width. In such case the roller 22 will roll substantially horizontally along the furrow bottom represented by the reference line 98. To obtain this result, the entire length of support leading edge 20 should lie in a plane substantially tangential to the roller 22. Because one end of the leading edge 20 is closer to the roller 22 than the other end (under point 96), and because the top plate 14 slopes downwardly from back to front, the aforementioned side-to-side slope of top plate 14 is necessary in order to cause both ends of the leading edge 20 to lie in the desired plane. The angle of the side-to-side slope of the top plate 14 is selected to cause the entire leading edge 20 to lie in the same plane.

In use, the support side plate 16 and the edger blade side face 82 are adjacent the sidewalk. The sod will be dug up from the ground in a substantially continuous strip which is severed from the adjacent sod by the relatively shorter edge 90. The strip thus cut from the ground is cammed upwardly along the surface 86 and off the side edge 92 onto the sidewalk. When the furrow is completely dug, the handgrip 28 can be pushed downwardly, whereupon the entire device 10 is pivoted about the axis of the roller 24 and the edger 10 is simply rolled out of the furrow. The sod deposited on the sidewalk by the blade 34 can be easily picked up and removed.

In FIG. 2, broken lines, designated 34a, illustrate the forwardmost throw of the edger blade 34, the full line position of the blade 34 represents an intermediate position, and broken lines 34b represent the rearmost throw. In general the throw of the blade 34 can be quite small provided that the leading knife edge 88 projects both behind and beyond the leading edge 20 during each complete vibrating cycle of the blade 34 so as to insure a vibratory impacting of the blade 34 against the ground. The throw of the blade 34 is preferably kept to a minimum and is at least partly behind the leading edge 20, so that there will be a minimal tendency of the entire edger 10 to bounce as it digs into and through the ground.

Although the presently preferred embodiment of this invention has been described, it will be understood that within the purview of this invention various changes may be made within the scope of the appended claims. For example, it will now be obvious that a second, smaller roller could be positioned forwardly of the roller 22 to assist in rolling the device horizontally along the furrow being dug.

Having thus described my invention, I claim:

1. A device for digging furrows or the like comprising:

a ground engageable blade having a plow-like leading surface, the bottom part of said surface terminating in a leading edge;

support means upon which said blade is mounted for guiding and constraining the movement of said blade, said support means having a top surface sloping downwardly from back to front and from side to side whereupon the ends of said leading edge lie in a common plane;

roller means mounted on said support means so that said roller means may roll along the furrow being dug by said device about an axis parallel to said common plane, thereby to enable said device to be used for digging a furrow having a bottom surface which is substantially horizontal across its width;

motor operated means mounted on said support means for imparting vibratory motion to said blade of a sufficiently long stroke to cause said leading edge to reciprocably move from a first position overlying said support means to a second position projecting beyond the leading part of said support means.

2. The apparatus of claim 1 wherein said support means is an inverted channel-shaped member and wherein said roller means is mounted on and between the margins of the sides of said channel-shaped member.

3. The apparatus of claim 2 wherein said motor operated means is mounted on the top of said channel-shaped member and includes a motor and eccentric drive means, said blade being mounted for sliding movement on said top.

4. The apparatus of claim 1 further including handle means connected to said support means remote from said blade whereby one gripping said handle means may pivot said support means about the axis of said roller means to the desired orientation of said support means with respect to the ground in which a furrow is being dug.

5. The apparatus of claim 1 wherein said motor operated means vibrates said blade at a speed on the order of 3,600 complete strokes per minute.

6. The device of claim 1 wherein said plow-like surface has a side edge for cutting sod dug by said blade away from sod adjacent said side edge.

7. The device of claim 1 wherein said plow-like surface tapers rearwardly and sidewardly whereby sod dug by said blade is cammed upwardly and off to one side thereof.

8. The apparatus of claim 1 wherein said support means and said blade have substantially coplanar and substantially vertical side surfaces whereby said support means and said blade may be placed immediately adjacent the side edge of a sidewalk or the like when a furrow is being dug thereby.

* * * * *

PO-1050
(5/69)

UNITED STATES PATENT OFFICE
CERTIFICATE OF CORRECTION

Patent No. 3,907,040                     Dated  Sept. 23, 1975

Inventor(s)  Von Aldo Trusty

It is certified that error appears in the above-identified patent and that said Letters Patent are hereby corrected as shown below:

Col. 1, line 28, "Boward" should be ---Broward---.

Col. 1, line 40, "law" should be ---lawn---.

Signed and Sealed this sixth Day of January 1976

[SEAL]

Attest:

RUTH C. MASON
*Attesting Officer*

C. MARSHALL DANN
*Commissioner of Patents and Trademarks*